United States Patent [19]

Kernen

[11] 3,968,861
[45] July 13, 1976

[54] ELEVATOR

[76] Inventor: Hans Kernen, Engehaldenstr. 69, 3012 Bern, Switzerland

[22] Filed: July 1, 1975

[21] Appl. No.: 592,228

[30] Foreign Application Priority Data

July 9, 1974 Switzerland.......................... 9439/74

[52] U.S. Cl.............................. 187/17; 104/147 R; 198/108; 198/140; 198/203
[51] Int. Cl.²......................................... B66B 11/04
[58] Field of Search.................... 187/1 R, 17; 198/1, 198/108, 140, 168, 203; 104/147 R, 165

[56] References Cited
UNITED STATES PATENTS

| | | | |
|---|---|---|---|
| 991,549 | 5/1911 | Schuchardt............................ | 187/17 |
| 2,424,055 | 7/1947 | Rousseau................................. | 198/1 |
| 2,517,444 | 8/1950 | Rousseau.............................. | 198/108 |
| 2,877,886 | 3/1959 | Braid..................................... | 198/108 |

*Primary Examiner*—Evon C. Blunk
*Assistant Examiner*—Jeffrey V. Nase
*Attorney, Agent, or Firm*—Wigman & Cohen

[57] ABSTRACT

An elevator capable of transporting persons or goods in any desired direction along a straight or curving path utilizes an endless guide tube comprising tracks and connecting sections and containing discrete transmission members driven along the tube by engagement with the teeth of a rotor. One of the transmission members projects through a slot running the length of the tube and is coupled to the elevator car, while the teeth of the rotor engage with the remaining transmission members through the same slot.

4 Claims, 9 Drawing Figures

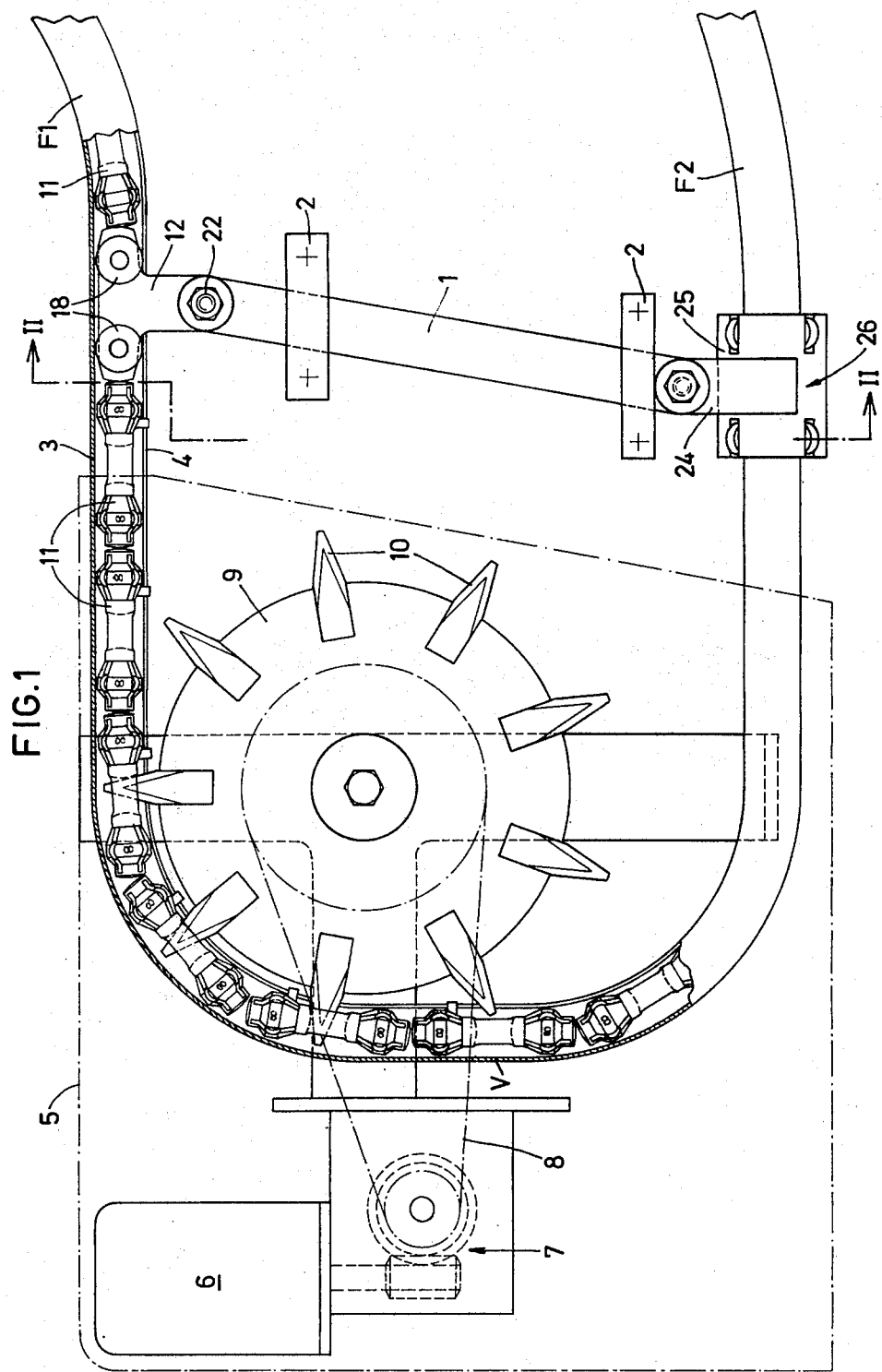

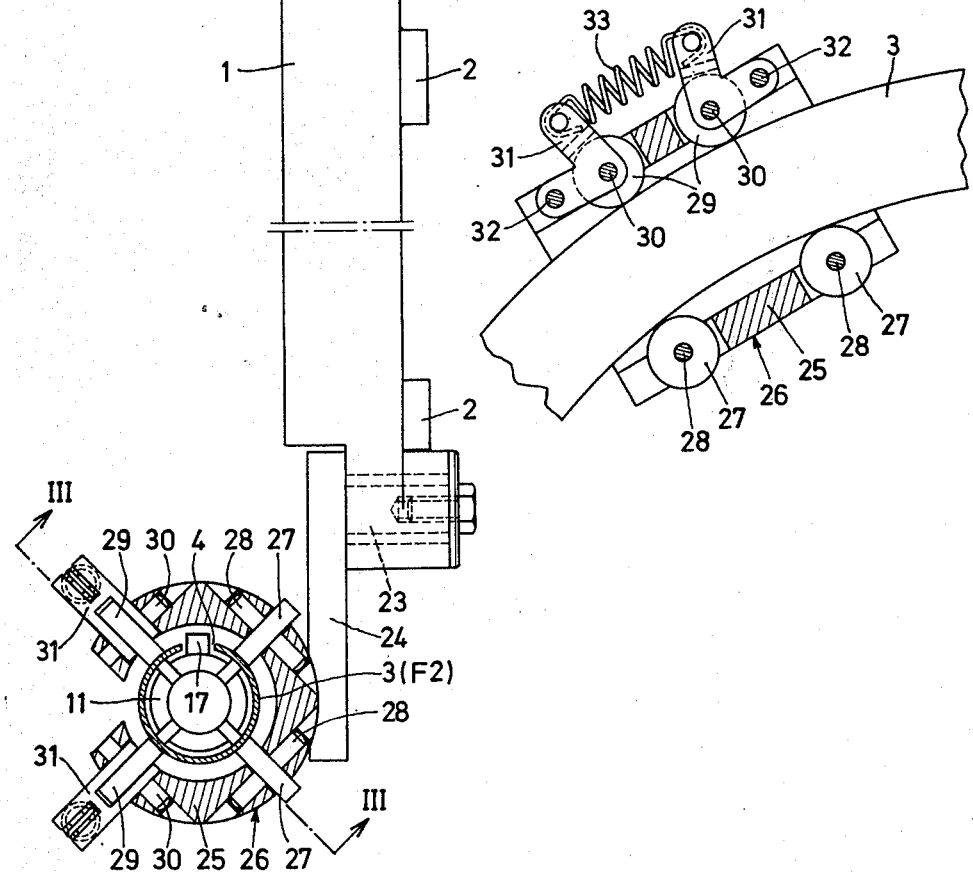

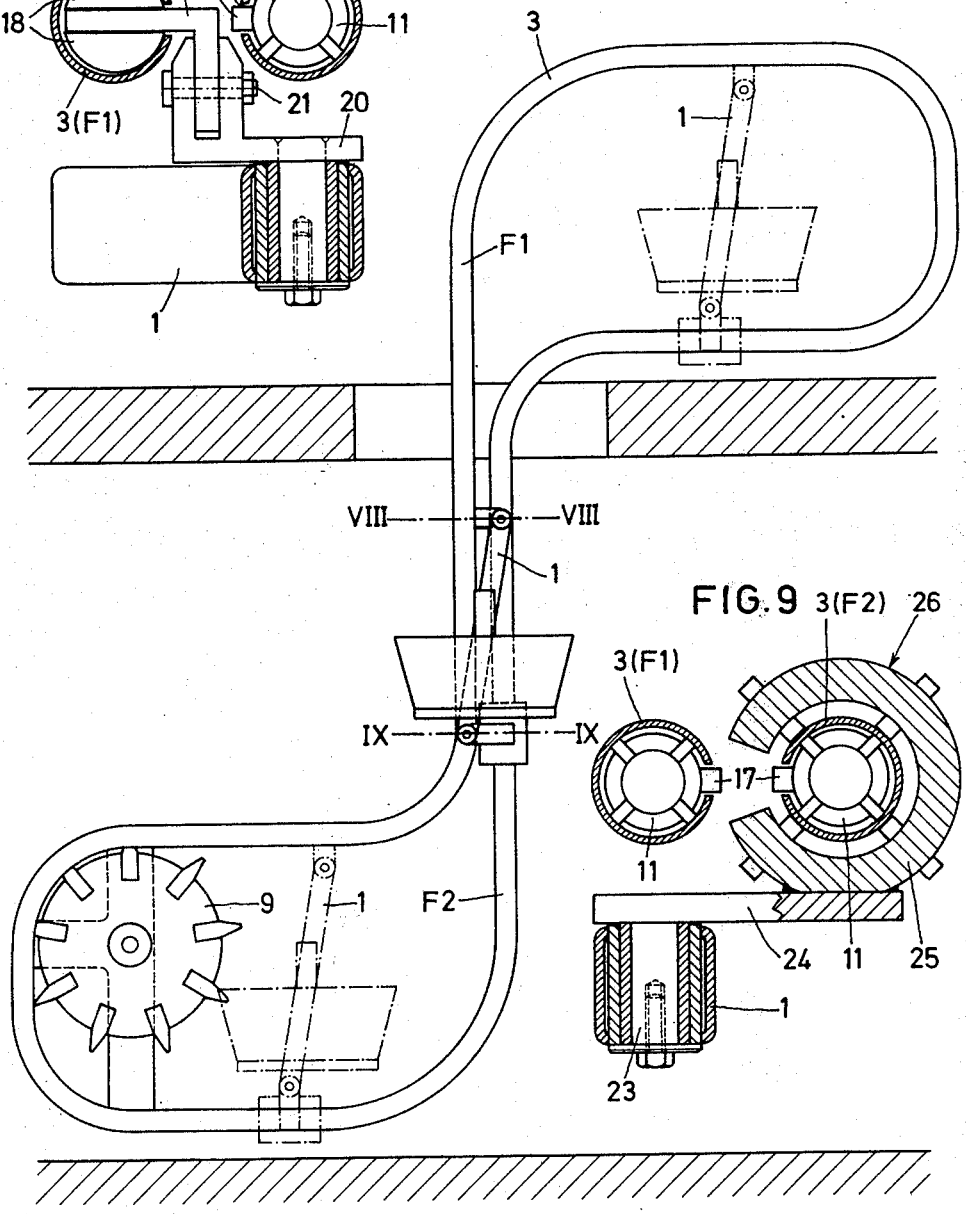

ELEVATOR

This invention relates to an elevator comprising a guide means, a car guided for reciprocating travel along the guide means, transmission means disposed in the guide means and comprising a substantially uninterrupted sequence of transmission members, and a motor drive means provided with teeth for engagement in the transmission means.

Besides the commonly-used vertical elevators, inclined elevators are also known for transporting both persons and goods. All of these elevators provide for a straight path of travel of the cabin or car.

It is the object of this invention to provide an elevator in which the path of travel may assume any spatial configuration, with straight portions—which may be horizontal, vertical, or inclined—being interconnected by curved sections, and in which such elements as transmit the driving energy to the car are, moreover, largely hidden from view.

To this end, in the elevator according to the present invention, the guide means comprises two parallel guide tracks of a guide tube endlessly closed upon itself by means of two connecting sections, the guide tube having along its entire length a slot extending along a generatrix thereof, the slot being situated in facing sides of the guide tracks and being narrower in width than the inside diameter of the guide tube; the transmission members are disposed in the guide tube, not connected to one another, are guided by an inside wall of the guide tube, and include a carrier member having a middle portion from which a tongue projects through the slot in the guide tube, the remaining transmission members being rams each having a middle portion in which there is a slot-like aperture aligned with the slot in the guide tube; and the teeth project through the slot into the guide tube and engage with the rams in the region of one of the connecting sections.

Two preferred embodiments of the invention will now be described in detail with reference to the accompanying drawings, in which:

FIG. 1 is a partial elevation of a first embodiment, partially in section,

FIG. 2 is a section taken on the line II—II of FIG. 1,

FIG. 3 is a section taken on the line III—III of FIG. 2,

FIG. 7 is an elevation of a second embodiment, and, FIGS. 8 and 9 are sections taken on the lines VIII—VIII and IX—IX, respectively, of FIG. 7.

The elevator illustrated in FIG. 1 is shown in part, only to the extent necessary for proper understanding of the invention. It comprises a car of which only a supporting bar 1 with welded-on crossbars 2 is shown; to the latter there may be secured, for example, a seat for a person or a basket or the like for goods to be transported.

The elevator further comprises a guide means, also shown only in part, along which the car, i.e., its supporting bar 1, is guided for reciprocating travel. This guide means consists essentially of parallel guide tracks F1 and F2 of a guide tube 3 which is endlessly closed upon itself by means of two connecting sections, only one of which, designated as V, is shown. Along its entire length the guide tube 3 has a slot 4 extending along a generatrix thereof and situated in the facing sides of the guide tracks F1, F2. Provided they are kept parallel to one another, the guide tracks F1, F2 may take any course through space, just as may be desired, it being possible to interconnect straight (horizontal, vertical, inclined) sections by means of curved sections (which may, for example, be helical), and also to interconnect variously curved sections.

The elevator further comprises a motor drive means and transmission means through which the drive means acts upon the car for causing it to travel.

Figure 4:
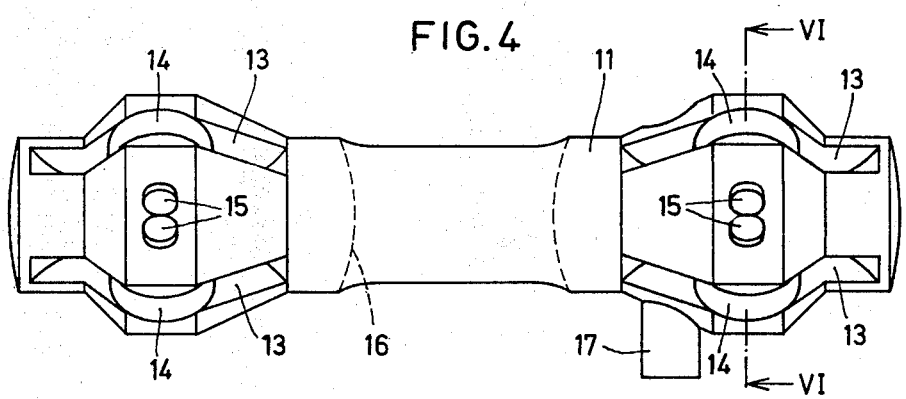
FIGS. 4 and 5 are two elevations of a transmission member viewed from directions at right angles to one another.
Figure 5:
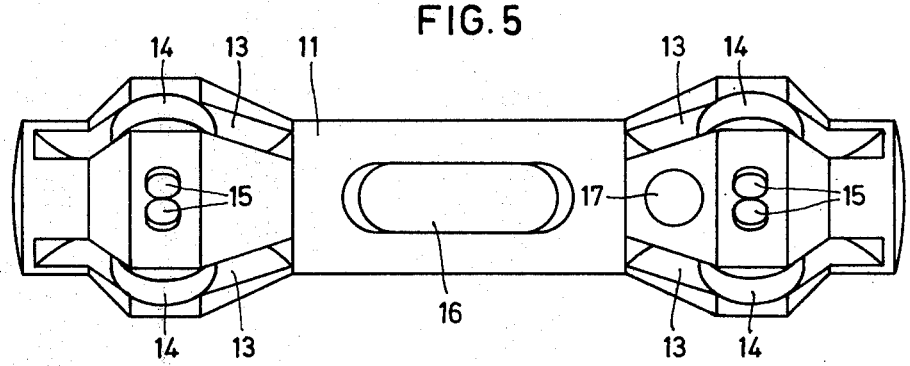
Figure 6:
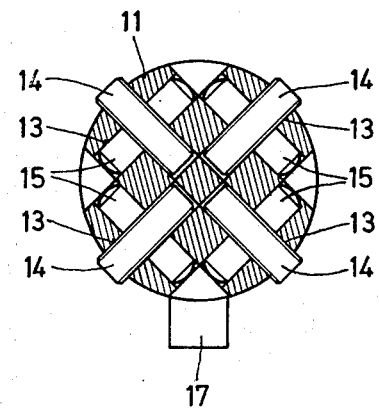
FIG. 6 is a section taken on the line VI—VI of FIG. 4.

In the embodiment illustrated in FIG. 1, the motor drive means is accomodated in a housing 5 indicated in dot-dash lines. It comprises an electric motor 6 which drives a rotor 9 by means of a worn gear 7 and a chain drive 8; the rotor 9 is mounted for rotation about an axis which is stationary with respect to the guide tube 3, and along its periphery it has regularly distributed teeth 10 which engage with rams 11 in the region of the connecting section V. Together with a carrier member 12, the rams 11 form part of the transmission means, and they and the carrier member 12 constitute transmission members. The transmission means comprise a substantially uninterrupted sequence of such transmission members, all disposed in the guide tube 3 and guided along the inner wall thereof. For this purpose—cf. especially FIGS. 4–6—there are four ball bearings 14, disposed in the form of a cross in grooves 13, in each of the two end portions of each ram 11; the inner race of each such ball bearing 14 is seated on a bearing pin 15 tightly fitted in an associated bore. In the middle portion of each ram 11 is a slot-like aperture 16, the cross-walls of which are convexly rounded; for each of the rotor-teeth 10 engages against one of these cross-walls, as is shown in FIG. 1. A radially projecting pin 17 is also fixed in one of the end portions of each ram 11. Each pin 17 engages in the longitudinal slot 4 of the guide tube 3 in order to prevent the respective ram 11 from rotating inside the guide tube 3 and thus to ensure that in the vicinity of the rotor 9, one of the latter's teeth 10 can enter the aperture 16. The end faces of each ram 11 and of the carrier member 12 are convex.

The main part of the carrier member 12 is a T-shaped plate, the crosspiece of which is disposed in the upper guide track F1 of the guide tube 3 and guided along the inner wall thereof by two pairs of guide rollers 18 (cf. FIGS. 1 and 2). The upright of the T-shaped plate projects through the longitudinal slot 4 of the guide tube 3 and is connected to the upper end portion of the supporting bar 1 of the car by means of a universal coupling 19, 20, 21, 22 (cf. FIG. 2). The lower end portion of the supporting bar 1 is non-slidingly mounted for rotation of a supporting journal 23 which projects out at a right angle at one end of a flat-iron part 24. The other end of the flat-iron part 24 is welded to a body 25 of a carriage 26 which—as is shown in FIGS. 1–3—is guided along the lower guide track F2 of the guide tube 3, on the outside thereof. The guiding function is performed by two pairs of guide rollers 27 which rotate on axle bearings 28 tightly fitted in bores in the body 25, and by two pairs of guide rollers 29 which rotate on smaller axle bearings 30 seated in angle levers 31; the angle levers 31 are mounted on the carriage-body 25 by means of hinge pins 32 and are connected to one another in pairs at their free ends, as shown in FIG. 3, by a tension spring 33, so that the guide rollers 27, 29 lie unobstructedly against the guide tube 3 in both the straight and the curved sections thereof.

As may be seen in FIG. 1, the supporting bar 1 of the car is inclined, so that the carrier member 12 is offset in the direction of travel to a certain extent with respect to carriage 26. This is necessary in order that there may be no restraint, especially when the car is moving through curved sections of its path of travel. Now since this path of travel may also be curved out of the plane of the drawing (i.e., three-dimensional), and since the carrier member 12 is offset with respect to the carriage 26 as just mentioned, the carrier member 12 will undergo a certain rotation about a vertical axis with respect to the carriage 26 at such locations; this rotation is made possible by the universal coupling pin 21.

When the elevator is in operation, the rotor 9, motor-driven in one or the other direction of rotation, will displace the endless sequence of transmission members—all of the rams 11 and the carrier member 12—in the guide tube 3 owing to the engagement of the rotor-teeth 10 with some of the rams 11, and the carrier member 12 will thereupon move the car back or forth accordingly. The guide track F2, on which the carriage 26 is guided and supported, serves at the same time as a return channel for a plurality of the rams 11.

The embodiment illustrated in FIGS. 7–9 is largely similar in its construction to the one described above and comprises the uninterrupted sequence of transmission members, i.e., the rams 11 (not shown in FIGS. 7–9) and a carrier member 12. Here the guide tracks F1 and F2 of the guide tube have two long, vertical sections which are connected to horizontal sections by means of arcuately-curved sections; the course followed is designed in such a way that the supporting bar 1 of the car always has the same inclination. The part of the carrier member 12 which projects from the guide tube 3 is angular and is connected by means of the pivot pin 21 to the part 20, upon the trunnion of which the upper end of the supporting bar 1 is mounted. In the vertical portion of the path of travel, this trunnion is situated in front of the guide track F2, whereas the trunnion belonging to the carriage 26 is situated in front of the guide track F1. The drive means may be disposed at any convenient location; a possible arrangement of the rotor 9 is shown in FIG. 7.

What is claimed is:

1. An elevator comprising a guide means, a car guided for reciprocating travel along said guide means, transmission means disposed in said guide means and comprising a substantially uninterrupted sequence of transmission members, and a motor drive means provided with teeth for engagement in said transmission means, wherein said guide means comprises two parallel guide tracks of a guide tube endlessly closed upon itself by means of two connecting sections, said guide tube having along its entire length a slot extending along a generatrix thereof, said slot being situated in facing sides of said guide tracks and being narrower in width than the inside diameter of said guide tube, said transmission members are disposed in said guide tube, not connected to one another, are guided by an inside wall of said guide tube, and include a carrier member having a middle portion from which a tongue projects through said slot, the remaining said transmission members being rams each having a middle portion in which there is a slot-like aperture aligned with said slot, and said teeth project through said slot into said guide tube and engage with said rams in the region of one of said connecting sections.

2. An elevator in accordance with claim 1, wherein said car comprises a supporting bar, said carrier member is adapted to move reciprocatingly in one of said guide tracks, and a sliding member having a further tongue similar to said tongue of said carrier member is guided on the outside of the other of said guide tracks, said supporting bar being hingedly connected at one end to said tongue of said carrier member and at the other end to said further tongue.

3. An elevator in accordance with claim 1, further comprising a universal coupling connecting said tongue of said carrier member to said one end of said supporting bar.

4. An elevator in accordance with claim 1, wherein each said ram comprises two end portions, and four ball bearings, disposed in the form of a cross and having outer races resting against the inner surface of said guide tube, are inserted in each said end portion.

* * * * *

UNITED STATES PATENT AND TRADEMARK OFFICE
CERTIFICATE OF CORRECTION

PATENT NO. : 3,968,861
DATED : July 13, 1976
INVENTOR(S) : HANS KERNEN

It is certified that error appears in the above—identified patent and that said Letters Patent are hereby corrected as shown below:

Column 2, line 16, change "worn" to --worm--;

Column 2, line 55, after "rotation", change "of" to --on--;

Claim 3, line 1, change "claim 1" to --claim 2--.

Signed and Sealed this

Eighth Day of February 1977

[SEAL]

Attest:

RUTH C. MASON
*Attesting Officer*

C. MARSHALL DANN
*Commissioner of Patents and Trademarks*